United States Patent
Gupta et al.

(10) Patent No.: US 9,760,665 B2
(45) Date of Patent: *Sep. 12, 2017

(54) VALIDATING VARIATION OF TIMING CONSTRAINT MEASUREMENTS

(71) Applicant: International Business Machines Corporation, Armonk, NY (US)

(72) Inventors: Sachin K. Gupta, Bangalore (IN); Vasant B. Rao, Fishkill, NY (US); Suriya T. Skariah, Ernakulam (IN); James E. Sundquist, Colchester, VT (US); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/833,069

(22) Filed: Aug. 22, 2015

(65) Prior Publication Data

US 2017/0011153 A1 Jan. 12, 2017

Related U.S. Application Data

(63) Continuation of application No. 14/792,779, filed on Jul. 7, 2015.

(51) Int. Cl.
*G06F 17/50* (2006.01)

(52) U.S. Cl.
CPC ...... *G06F 17/5036* (2013.01); *G06F 17/5031* (2013.01)

(58) Field of Classification Search
CPC G01R 31/316; G01R 31/317; G01R 31/3016; G01R 31/3167; H02J 17/5009;
(Continued)

(56) References Cited

U.S. PATENT DOCUMENTS

| 8,204,730 B2 | 6/2012 | Liu et al. |
| 8,356,263 B1 | 1/2013 | Zhang et al. |

(Continued)

OTHER PUBLICATIONS

Sundareswaran et al., "Characterization of Standard Cells for Intra-Cell Mismatch Variations," 9th International on Quality Electronic Design, 2008 (ISQED 2008), San Jose, CA, Mar. 2008, pp. 213-219.

(Continued)

*Primary Examiner* — Paul Dinh
(74) *Attorney, Agent, or Firm* — VanLeeuwen & VanLeeuwen; Damion C. Josephs

(57) ABSTRACT

An approach is provided in which an information handling system executes multiple timing constraint sensitivity tests on a circuit model using a first signal arrival time and generates multiple test results. The information handling system compares the multiple test results with a pre-determined probability threshold and, in response to determining that an amount of test failures included in the multiple test results meets a pre-determined failure probability threshold, the information handling system computes a timing constraint sensitivity of the circuit model based upon the first signal arrival time. The information handling system compares the timing constraint sensitivity against a characterized sensitivity generated by a software modeling system and, when the timing constraint sensitivity does not match the characterized sensitivity, one or more of the software modeling system's modeling parameters are adjusted, causing the software modeling system to generate a changed characterized sensitivity of the circuit model.

10 Claims, 9 Drawing Sheets

(58) Field of Classification Search
CPC .............. H02J 17/4022; H02J 17/5031; H02J 17/5036; G06F 17/5009; G06F 17/4022; G06F 17/5031; G06F 17/5036
USPC ................................ 716/108, 113, 134, 136
See application file for complete search history.

(56) References Cited

U.S. PATENT DOCUMENTS

| | | |
|---|---|---|
| 8,713,502 B1 | 4/2014 | Date et al. |
| 2007/0143722 A1* | 6/2007 | Venkateswaran ... G06F 17/5031 716/108 |

OTHER PUBLICATIONS

Sundareswaran et al., "Characterization of Sequential Cells for Constraint Sensitivities," 9th International on Quality Electronic Design, 2008 (ISQED 2008), San Jose, CA, Mar. 2008, pp. 74-79.
Gupta et al., "Validating Variation of Timing Constraint Measurements," U.S. Appl. No. 14/792,779, filed Jul. 7, 2015, 43 pages.
"List of IBM Patents or Patent Applications Treated as Related," Letter from Leslie A. Van Leeuwen, Aug. 22, 2015, 1 page.

* cited by examiner

Hold Test Results 900

| Run | AT Signal | AT(Sig)-AT(Ref) | V @ latch node | Deviation from Nominal | pFails | pPass | |
|---|---|---|---|---|---|---|---|
| 0 | 3.8787000E-09 | -19.2909565 | 0.00082029 | -4.4502 | 0.9986 | 0.0014 | -3 sigma value = - 4.4502 ps |
| 1 | 3.8788000E-09 | -19.1909565 | 0.00052098 | -4.3502 | 0.9983 | 0.0017 | |
| 2 | 3.8788300E-09 | -19.1609565 | 0.00051147 | -4.3202 | 0.9983 | 0.0017 | |
| 3 | 3.8789000E-09 | -19.0909565 | 0.00053484 | -4.2502 | 0.9974 | 0.0026 | |
| 4 | 3.8790000E-09 | -18.9909565 | 0.00052436 | -4.1502 | 0.9972 | 0.0028 | |
| 5 | 3.8795810E-09 | -18.4099565 | 0.00052801 | -3.5692 | 0.9924 | 0.0076 | |
| 6 | 3.8800000E-09 | -17.9909565 | 0.00051891 | -3.1502 | 0.9823 | 0.0177 | |
| 7 | 3.8810000E-09 | -16.9909565 | 0.00052158 | -2.1502 | 0.9272 | 0.0728 | |
| 8 | 3.8820000E-09 | -15.9909565 | 0.00056083 | -1.1502 | 0.7891 | 0.2109 | |
| 9 | 3.8830000E-09 | -14.9909565 | 0.00057053 | -0.1502 | 0.5392 | 0.4608 | |
| 10 | 3.8831501E-09 | -14.8408565 | 0.00054872 | -0.0001 | 0.4929 | 0.5071 | |
| 11 | 3.8831502E-09 | -14.8407565 | 0.00052631 | 0 | 0.5 | 0.5 | Nominal Hold Time = -14.8407565 ps |
| 12 | 3.8840000E-09 | -13.9909565 | 0.59978 | 0.8498 | 0.2616 | 0.7384 | |
| 13 | 3.8850000E-09 | -12.9909565 | 0.59978 | 1.8498 | 0.0813 | 0.9187 | |
| 14 | 3.8860000E-09 | -11.9909565 | 0.59978 | 2.8498 | 0.0179 | 0.9821 | |
| 15 | 3.8867190E-09 | -11.2719565 | 0.59978 | 3.5688 | 0.0051 | 0.9949 | |
| 16 | 3.8870000E-09 | -10.9909565 | 0.59978 | 3.8498 | 0.0016 | 0.9984 | |
| 17 | 3.8870700E-09 | -10.9209565 | 0.59978 | 3.9198 | 0.0014 | 0.9986 | +3 sigma value = 3.9198 ps |
| 18 | 3.8871000E-09 | -10.8909565 | 0.59978 | 3.9498 | 0.0017 | 0.9983 | |
| 19 | 3.8872000E-09 | -10.7909565 | 0.59978 | 4.0498 | 0.0009 | 0.9991 | |

910 920 930 940 950 960 970

980 (Nominal Hold Time row)
990 (+3 sigma value row)

*FIG. 9*

VALIDATING VARIATION OF TIMING CONSTRAINT MEASUREMENTS

BACKGROUND

The present disclosure relates to computing timing constraint sensitivities of circuit models based upon actual test probability measurements and using the timing constraint sensitivities to verify characterized circuit model sensitivities that were generated during library characterization.

Integrated circuit design involves the creation of electronic components, such as transistors, resistors, capacitors and the metallic interconnect of these components onto a piece of a semiconductor, such as silicon. A typical standard cell based integrated circuit design cycle involves multiple stages such as system specification, architectural design, functional/logic design, static timing analysis, physical design, timing optimization, and fabrication.

Integrated circuit wafer fabrication facilities adhere to strict standards in each stage of producing integrated circuits. Even with the strict standards, slight variations occur between wafer lots, wafers within a lot, dies within a wafer, and within a die. Transistor variation within a die is referred to as across chip variation (ACV) which can be systematic (correlated), where each transistor has the same random variation, or random (uncorrelated) where each transistor has its own unique random variation. Random ACV may be caused by variations in impurity concentration densities, oxide thicknesses, diffusion depths, etc.

Accurate timing constraint modeling (setup, hold, pulse width) for sequential elements (latches, flip flops, etc.) is essential for designing high performance circuits. A typical sequential circuit may consist of several transistors each of which has properties such as length, width and threshold voltage that, due to random ACV, can vary independently from transistor to transistor. Timing constraints are sensitive to these variations that, in turn, cause uncertainty in circuit behavior and must be accounted for and characterized as timing constraint sensitivities. Timing constraints, and timing constraint sensitivities to ACV, are key inputs to Statistical Static Timing Analysis (SSTA) tools for a successful integrated circuit design.

BRIEF SUMMARY

According to one embodiment of the present disclosure, an approach is provided in which an information handling system executes multiple timing constraint sensitivity tests on a circuit model using a first signal arrival time and generates multiple test results. The information handling system compares the multiple test results with a pre-determined probability threshold and, in response to determining that an amount of test failures included in the multiple test results meets a pre-determined failure probability threshold, the information handling system computes a timing constraint sensitivity of the circuit model based upon the first signal arrival time. The information handling system compares the timing constraint sensitivity against a characterized sensitivity generated by a software modeling system and, when the timing constraint sensitivity does not match the characterized sensitivity, one or more of the software modeling system's modeling parameters are adjusted, causing the software modeling system to generate a changed characterized sensitivity of the circuit model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 9 is an exemplary diagram depicting hold test sensitivity results with different signal arrival times that include test failure probabilities and test pass probabilities.

DETAILED DESCRIPTION

Figure 1:
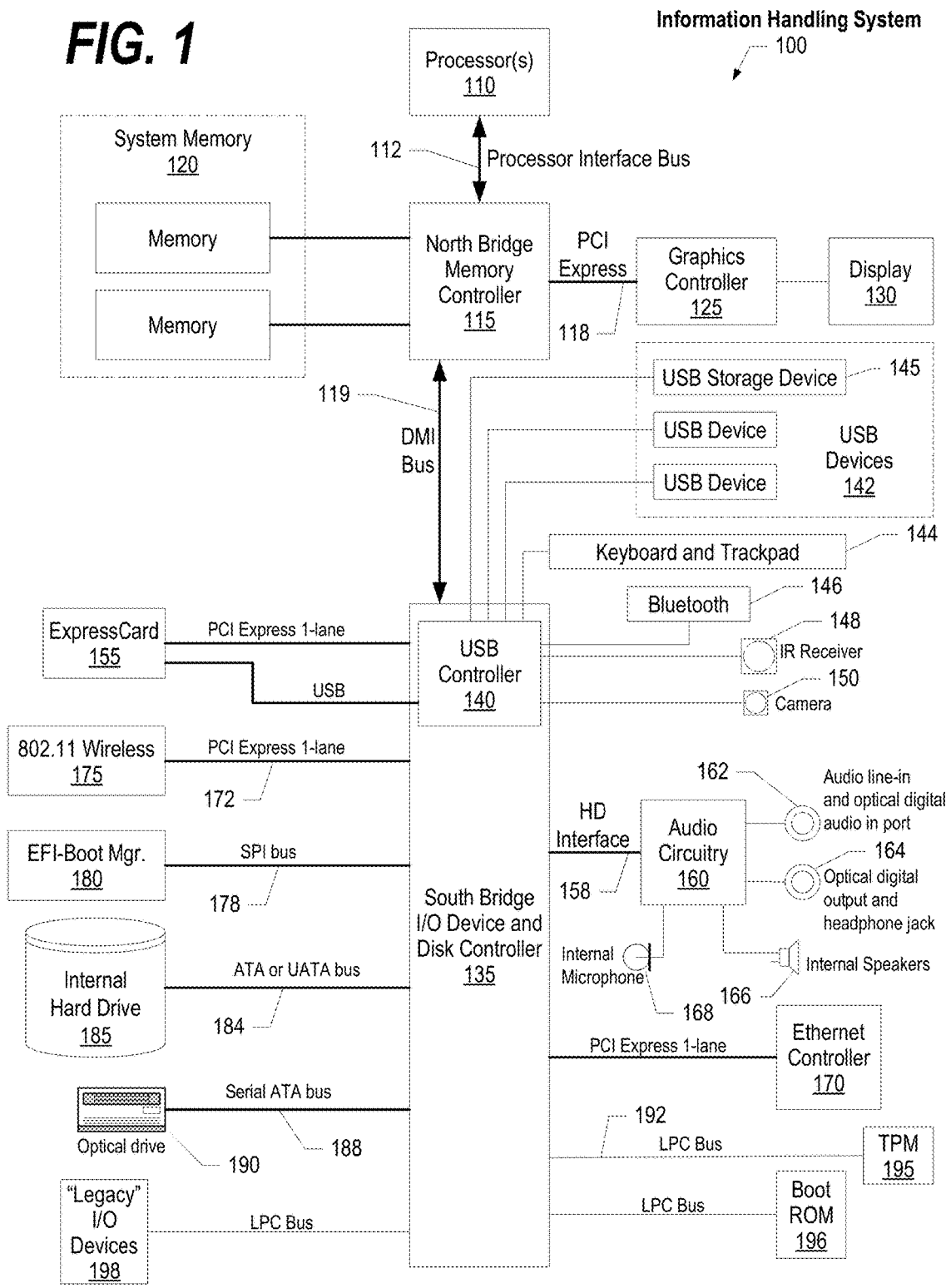
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
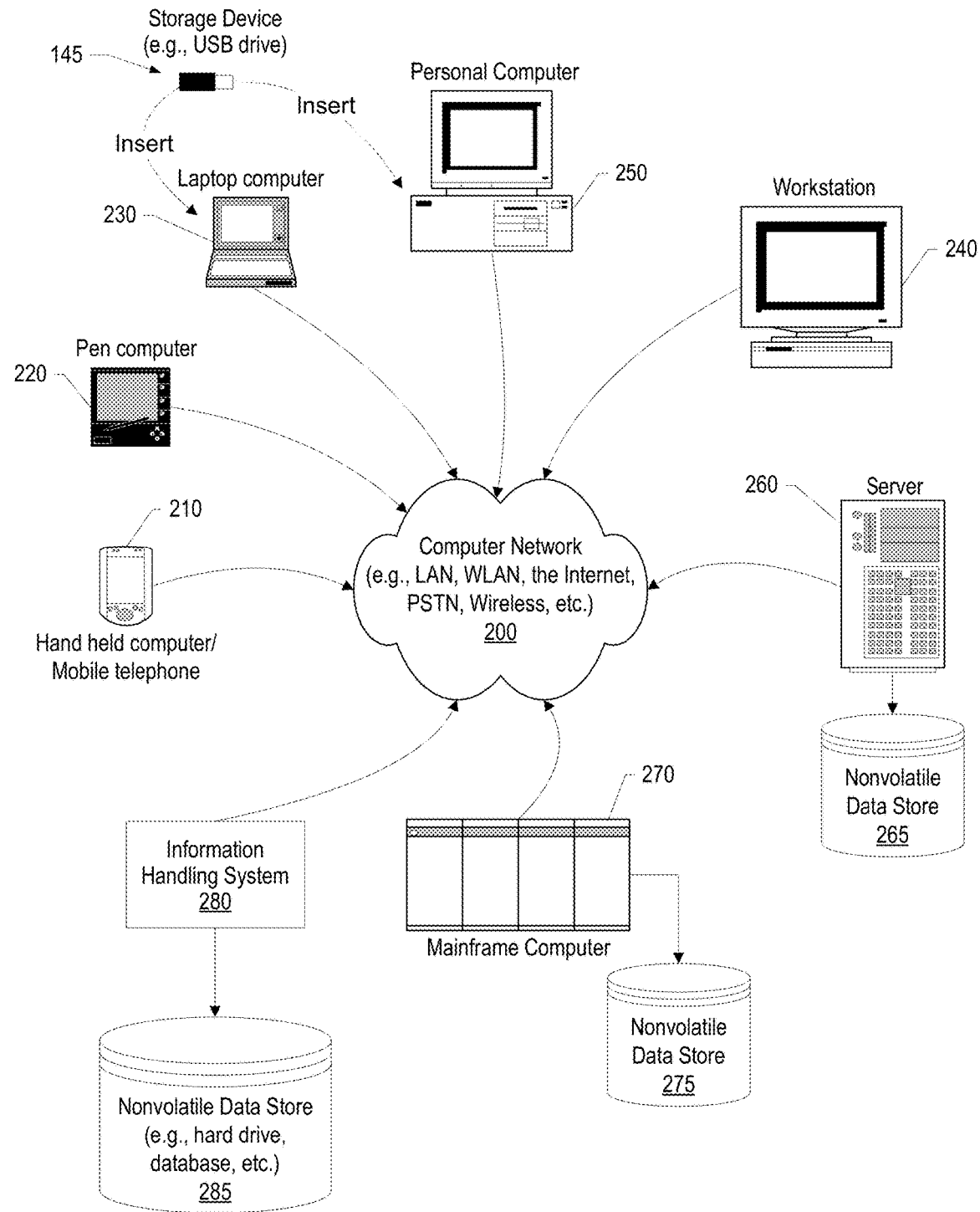
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system. The information handling system executes multiple timing constraint sensitivity tests on a circuit model using a particular signal arrival time to generate multiple test results. When the amount of test failures included in the multiple test results meets a pre-determined probability threshold, the information handling system uses the particular signal arrival time to compute timing constraint sensitivities of the circuit model. The computed timing constraint sensitivities are an accurate representation of the circuit model because they are based upon the circuit model's actual test failure variability. As such, the computed timing constraint sensitivities are used to provide an independent and accurate standard to compare against more efficiently produced but less accurate characterized sensitivities of the circuit model that are generated during library characterization by a software modeling system. The characterized sensitivities generated during library characterization are verified when the comparison results in a match or good correlation (e.g., +/−2%). On the other hand, when the comparison does not result in a match or a good correlation, modeling parameters are adjusted on the software modeling system, which causes the software modeling system to generate more accurate characterized sensitivities of the circuit model. In one embodiment, modeling parameter adjustments may correspond to technology model setting parameter adjustments, circuit model configuration parameter adjustments, simulation stimulus parameter adjustments, and/or sensitivity measurement results calculation parameter adjustments.

Figure 3:
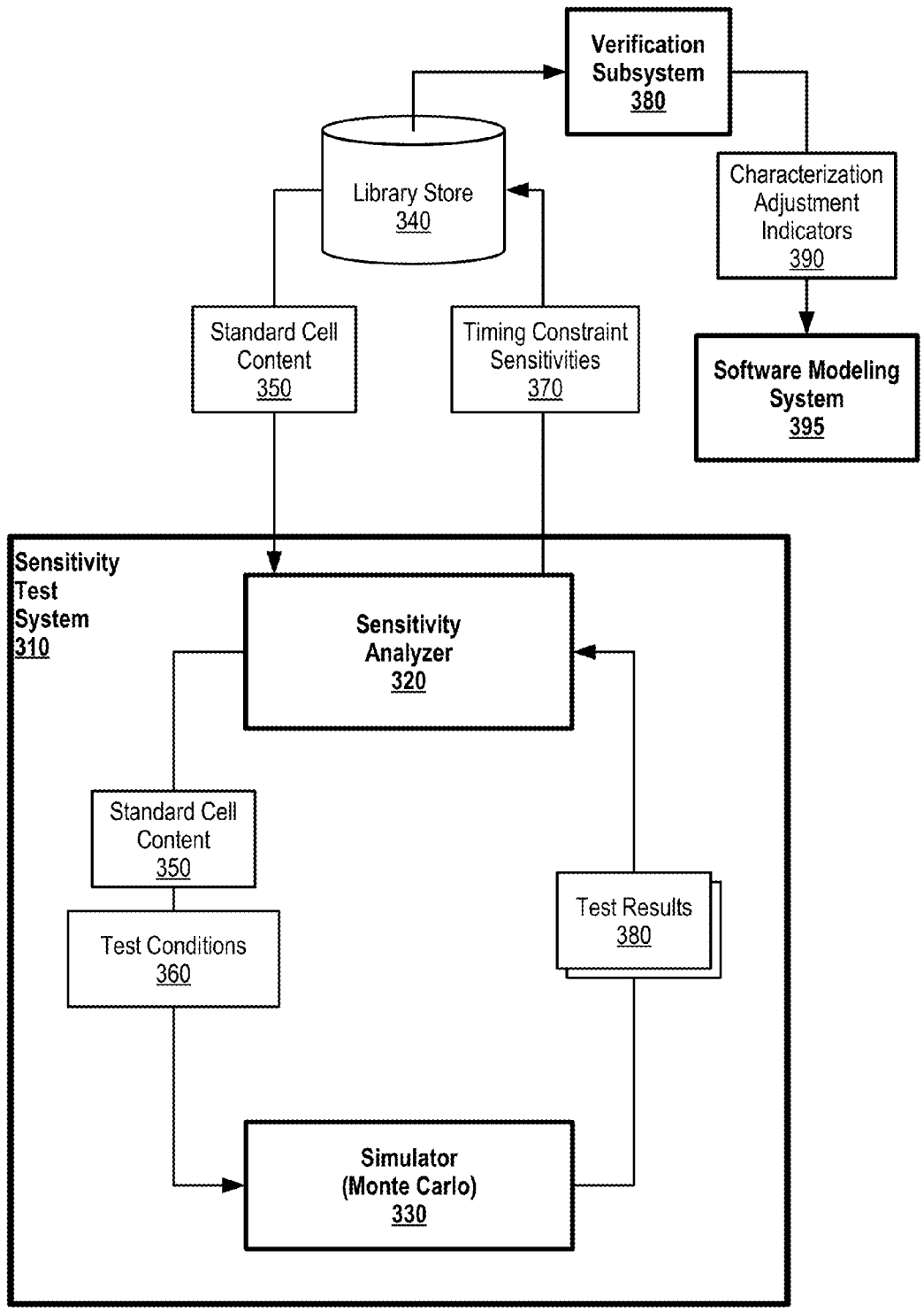
FIG. 3 is an exemplary diagram depicting a sensitivity test system determining timing constraint sensitivities based upon actual simulation test results.

FIG. 3 is an exemplary diagram depicting a sensitivity test system determining timing constraint sensitivities based upon actual simulation test results and using the timing constraint sensitivities to verify characterized circuit model sensitivities. Sensitivity test system 310 computes a standard cell's timing constraint sensitivity through actual sensitivity tests using simulator 330. In one embodiment, simulator 330 may be a Monte Carlo simulator. As those skilled in the art can appreciate, other types of simulators may be used to simulate standard cell timing properties.

Sensitivity analyzer 320 retrieves standard cell content 350 from library store 340, which includes information pertaining to a particular sequential library cell such as, for example, device model information and circuit model information. In one embodiment, standard cell content 350 includes intrinsic guard times that were determined using techniques such as binary search simulations. The intrinsic guard times, or referred to herein as guard times, identify a signal arrival time at which a test pass probability of a timing test, referred to herein as a sensitivity test, is 50% (e.g., setup test, hold test, or pulse width test, see FIGS. 5-7 and corresponding text for further details).

Sensitivity test system 310 determines a standard cell's sensitivity based upon, for example, a pre-determined 3-sigma probability threshold. In one embodiment, sensitivity test system 310 presumes a Gaussian pass/fail test result distribution, which has 99.73% of its area between +3 sigma and −3 sigma. As such, the area outside of the +/−3 sigma range is approximately 0.27% that, when divided equally results in 0.135% on either side of the distribution. In turn, for a sample size of 10,000 sensitivity tests, 0.135% equates to 13.5 failures, or approximately 13-14 failures per 10,000 attempts to achieve 3 sigma variability.

Sensitivity analyzer 320 provides standard cell content 350 and test conditions 360 to simulator 330. Test conditions 360 include a signal arrival time, test bench information, and operating conditions. In one embodiment, sensitivity analyzer 320 may set the initial signal arrival time at a relaxed value to ensure a large test passing percentage (~100%). Test bench information may include input waveform, power supplies, test points (internal circuit probing and initial conditions), etc. Operating condition information may include PVT (Process Voltage Temperature), input slew(s) (transition time of voltage waveform on input pin(s) during measurements) and output load(s) (capacitance values to apply to output pin(s) during measurements).

Simulator 330 simulates the standard cell a pre-determined number of times using the same signal arrival time. For example, simulator 330 may simulate the standard cell 10,000 times using a 10 picosecond signal arrival time. At each of the 10,000 simulations, a random ACV parameter value is applied to each transistor that is different from the previous run and different from the value applied to all other transistors in the circuit. Simulator 330, in turn, provides test results 380 to sensitivity analyzer 320, which may be in the form of a number of passes or the number of failures.

Sensitivity analyzer 320 computes a test failure probability, or test pass probability, from test results 380 and compares the test failure probability with the pre-determined 3-sigma probability threshold. For example, sensitivity analyzer may determine that test results 380 include two failures out of 10,000 simulations, resulting in a 0.002% test failure probability. In this example, sensitivity analyzer 320 adjusts the signal arrival time such that the signal transition occurs closer to the reference transition, denoted by the reference arrival time, to increase the test failure probability to reach the 0.135% pre-determined 3-sigma threshold. In turn, sensitivity analyzer 320 initiates simulator 330 to re-simulate the standard cell multiple times (e.g., 10,000 times) using the adjusted signal arrival time.

When tests results 380 generates a test failure probability that is approximately 0.135%, the utilized signal arrival time is sufficient to provide a 3-sigma design margin. As such, sensitivity analyzer 320 computes a timing constraint sensitivity using the signal arrival time, a reference arrival time, and the guard time (see FIGS. 5, 6, 7, and corresponding text for further details). In turn, sensitivity analyzer 320 stores timing constraint sensitivities 370 in library store 340 (e.g., .lib file).

Verification subsystem 380 retrieves characterized sensitivities generated by software modeling system 395 during library characterization of the sequential library cell. In one embodiment, the characterized sensitivities represent the sensitivity of each timing constraint arc of the sequential library cell at each clock and data slew. Software modeling system 395, in one embodiment, is a library characterization system that encompasses a software suite executing on a computer system. In this embodiment, software modeling system 395 retrieves IP models and device models and produces the characterized sensitivities based upon the modeling parameters of software modeling system 395, such technology model setting parameters, circuit model configuration parameters, simulation stimulus parameters, and/or sensitivity measurement results calculation parameters.

Verification subsystem 380 compares timing constraint sensitivities 370 against the retrieved characterized sensitivities generated during library characterization to determine whether the characterized sensitivities are within a pre-defined tolerance of timing constraint sensitivities 370 (e.g., +/−2%). When the characterized sensitivities fall outside of the pre-defined tolerance, verification subsystem 380 generates characterization adjustment indicators 390 that flag characterized sensitivities not matching timing constraint sensitivities 370, thus indicating adjustments to modeling parameters of software modeling system 395. For example, software modeling system 395 may be incorrectly setting technology model parameters, incorrectly configuring or stimulating circuit model, making incorrect measurements, or incorrectly calculating sensitivities. In turn, the modeling parameter adjustments are made to software modeling system 395 based upon characterization adjustment indicators 390 and, in turn, software modeling system 395 generates more accurate characterized sensitivities.

Figure 4:
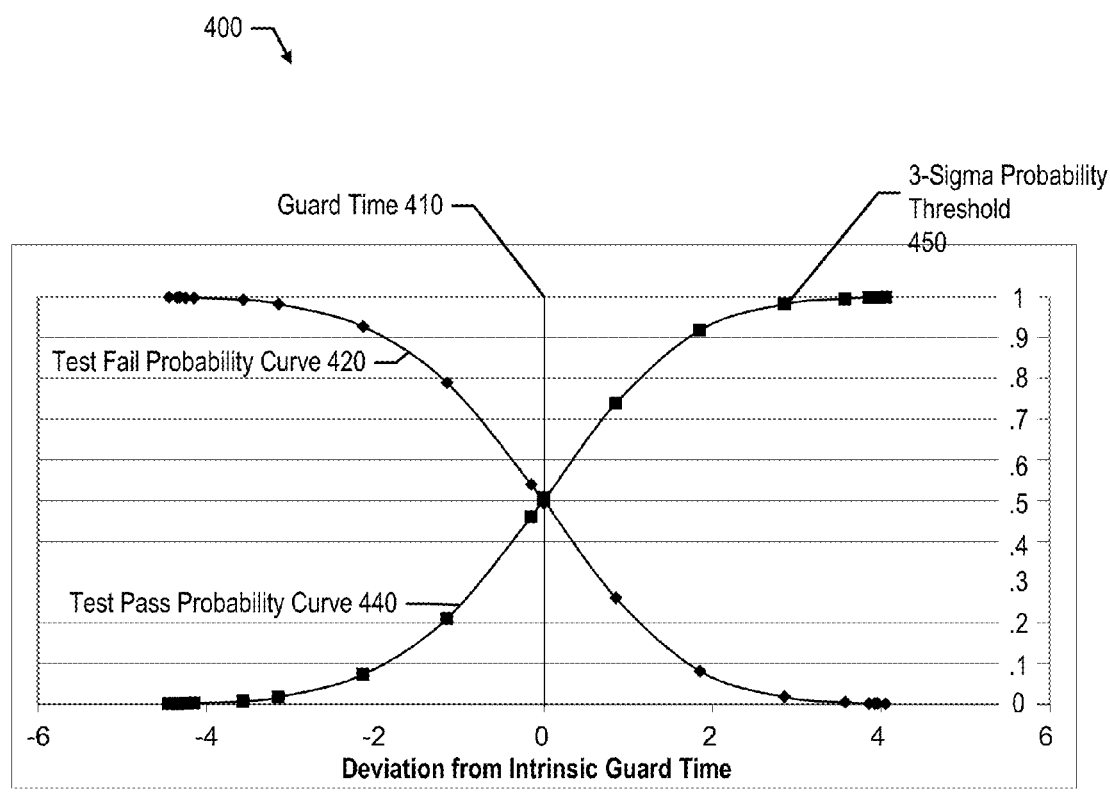
FIG. 4 is an exemplary diagram depicting pass/fail probabilities relative to a standard cell's intrinsic guard time for a hold test.

FIG. 4 is an exemplary diagram depicting pass/fail probabilities relative to a standard cell's intrinsic guard time for a hold test. Graph 400 includes intrinsic guard time 410 (e.g., 10 pico seconds) at the center, which is a signal arrival time that produces a 50% failure rate. Test fail probability curve 420 shows that the probability of failures increase as the signal arrival time decreases (negative deviation), and the probability of failures decreases as the signal arrival time increases (positive deviation). Likewise, test pass probability curve 440 shows that the probability of passes decreases as the signal arrival time decreases (negative deviation), and the probability of passes increases as the signal arrival time increases (positive deviation). When the sensitivity test system determines that a particular signal arrival time reaches 3-sigma probability threshold 450, the sensitivity test system uses the corresponding signal arrival time to compute the standard cell's timing constraint sensitivity as discussed herein (see FIGS. 5, 6, 7, and corresponding text for further details).

Figure 5:
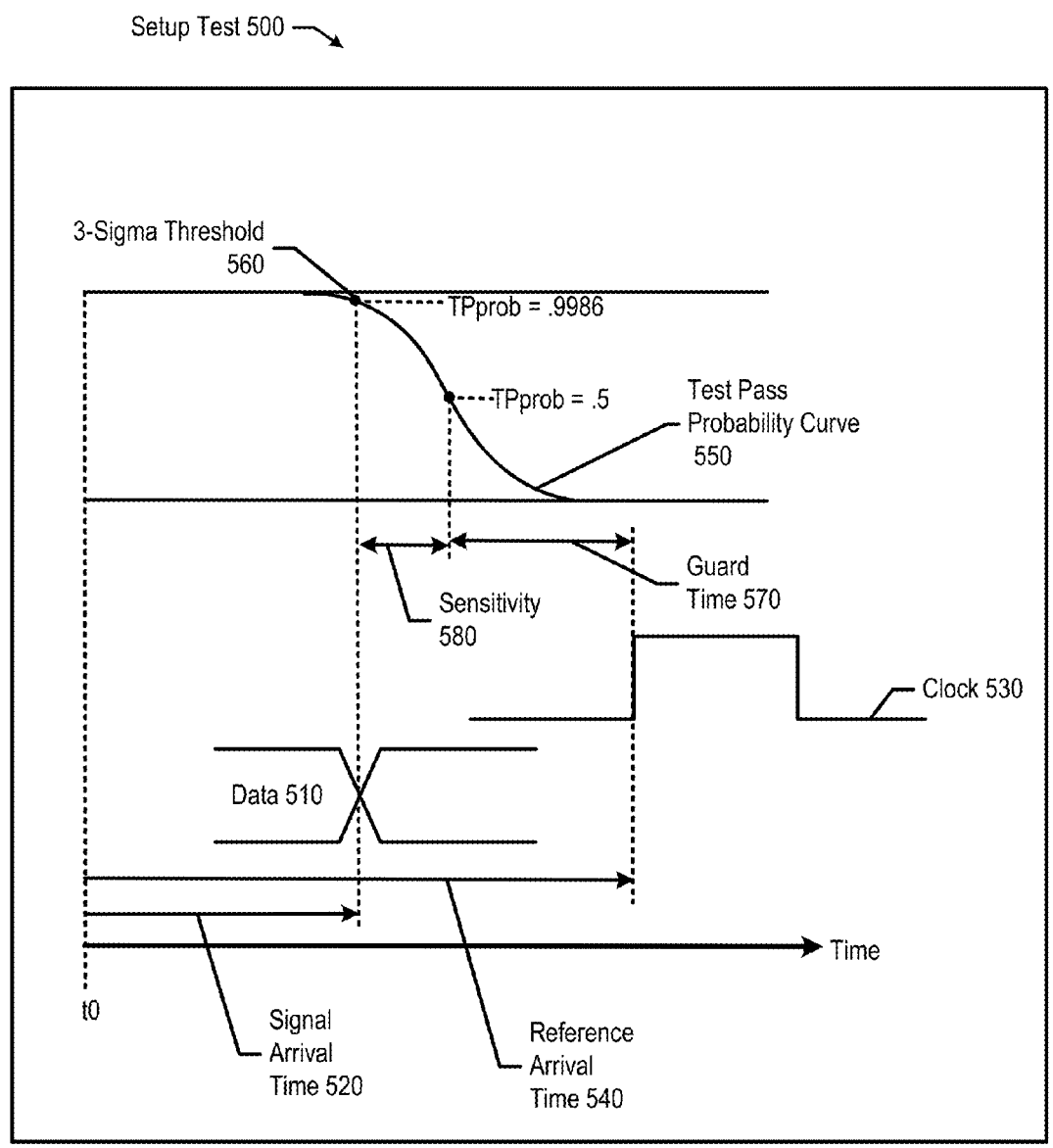
FIG. 5 is an exemplary diagram showing a signal arrival time for a setup test that generates test results meeting a 3-sigma probability threshold.

FIG. 5 is an exemplary diagram showing a signal arrival time for a setup test that generates test results meeting a 3-sigma probability threshold. Diagram 500 shows the relationship between data 510 having signal arrival time 520 and clock 530 having reference arrival time 540. As can be seen, signal arrival time 520 produces test results with a test pass probability of 0.9986, meeting 3-sigma probability threshold 560 on test pass probability curve 550. As those skilled in the art can appreciate, test pass probability curve 550 is inverted relative to that shown in FIG. 4 because FIG. 4 is based on a hold test and FIG. 5 is based on a setup test. In other words, the setup test pass probability increases as the signal arrival time decreases.

The sensitivity test system computes setup test sensitivity 580 using the following formula:

$$\text{Sensitivity} = \text{reference arrival time} - \text{signal arrival time} - \text{guard time}.$$

As discussed earlier, guard time 570 is a signal arrival time that generates a test pass probability of 0.5, or 50%. In one embodiment, guard time 570 is retrieved from a standard cell's ".lib" file. In another embodiment, the sensitivity test system executes sensitivity tests to identify the signal arrival time that produces a test pass probability of 0.5 and assigns the corresponding signal arrival time as the guard time.

Figure 6:
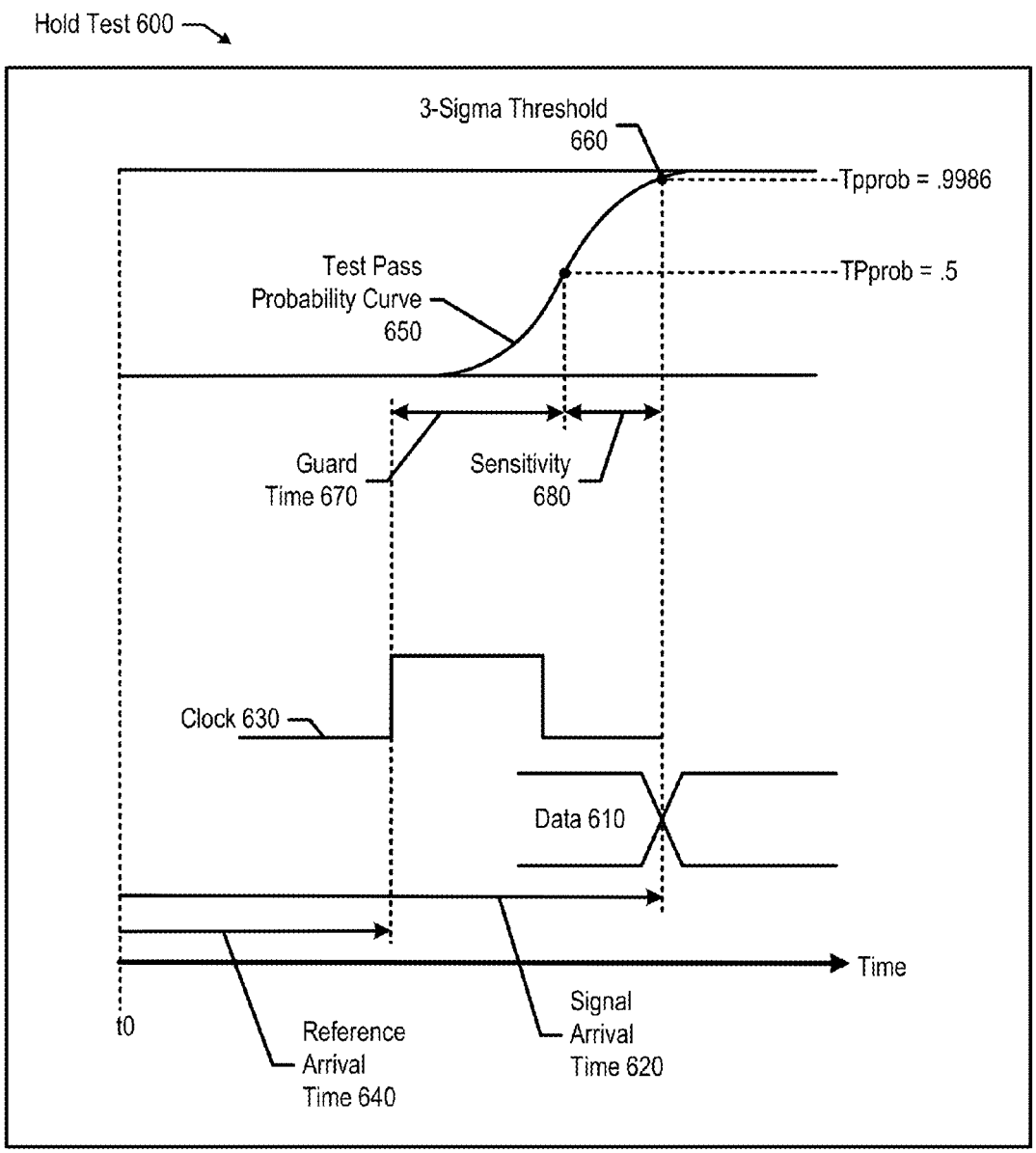
FIG. 6 is an exemplary diagram showing a signal arrival time for a hold up test that generates test results meeting a 3-sigma probability threshold.

FIG. 6 is an exemplary diagram showing a signal arrival time for a hold test that generates test results meeting a 3-sigma probability threshold. Diagram 600 shows the relationship between data 610 having signal arrival time 620 and clock 630 having reference arrival time 640. As can be seen, signal arrival time 620 produces test results with a test pass probability of 0.9986, meeting 3-sigma probability threshold 660 on test pass probability curve 650.

The sensitivity test system computes hold test sensitivity 680 using the following formula:

$$\text{Sensitivity} = \text{signal arrival time} - \text{reference arrival time} - \text{guard time}.$$

Figure 7:
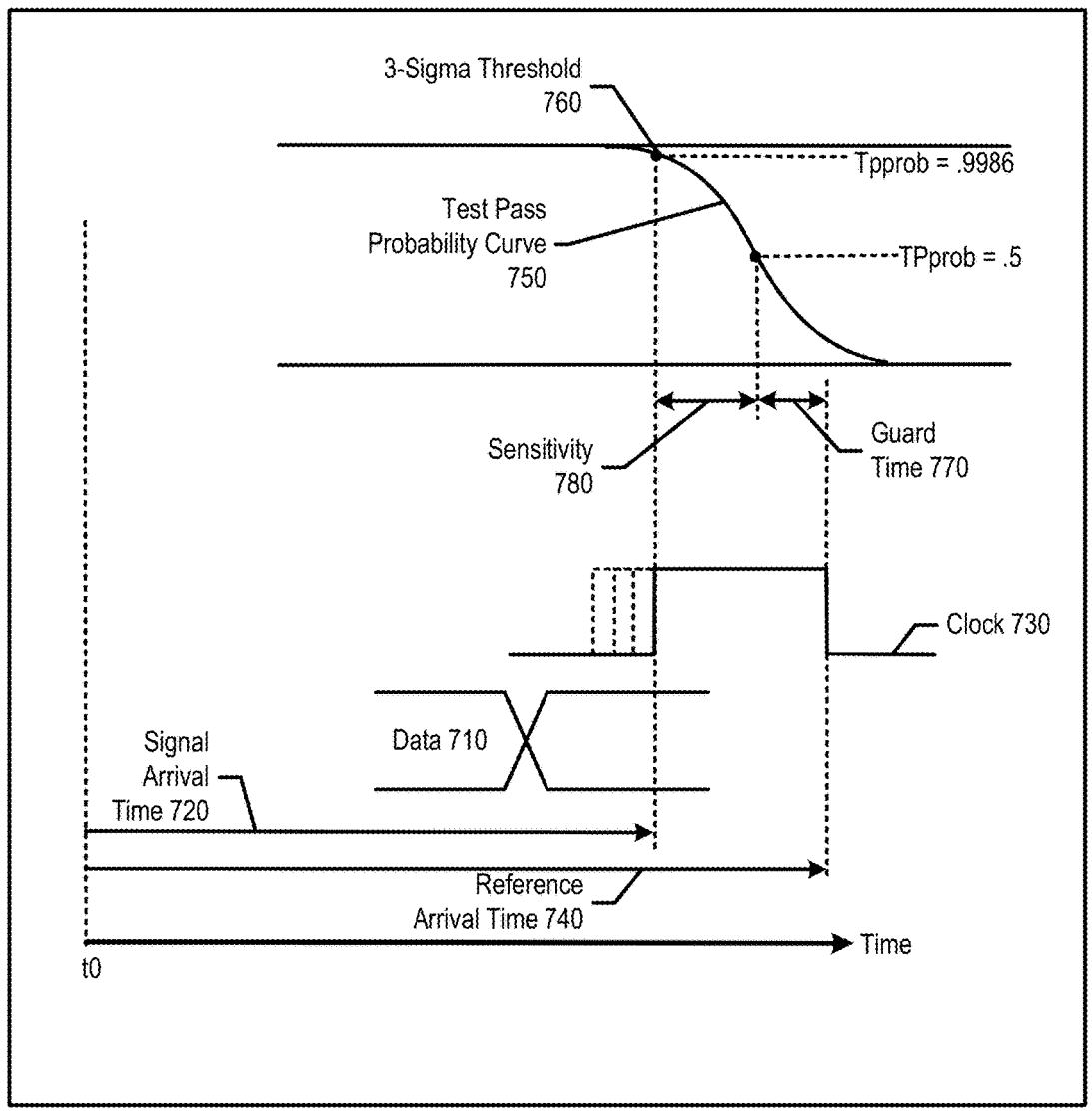
FIG. 7 is an exemplary diagram showing a signal arrival time for a pulse width test that generates test results meeting a 3-sigma probability threshold.

FIG. 7 is an exemplary diagram showing a signal arrival time for a pulse width test that generates test results meeting a 3-sigma probability threshold. Diagram 700 shows data 710 relative to clock 730. In one embodiment, data 710's arrival time remains fixed during a pulse width test while the leading edge of clock 730 varies to produce test results with a test pass probability of 0.9986, meeting 3-sigma probability threshold 760 on test pass probability curve 750.

FIG. 7 shows that reference arrival time 740 corresponds to the trailing edge of clock 730, and signal arrival time 720 corresponds to the leading edge of clock 730. As such, clock 730's pulse width decreases as signal arrival time 720 increases, thus reducing the test pass probability. Guard time 770 indicates the pulse width of clock 730 that results in a 50% pass rate probability.

When signal arrival time 720 produces the test pass probability of 0.9986, the sensitivity test system computes pulse width test sensitivity 780 using the following formula:

$$\text{Sensitivity} = \text{reference arrival time} - \text{signal arrival time} - \text{guard time}.$$

Figure 8:
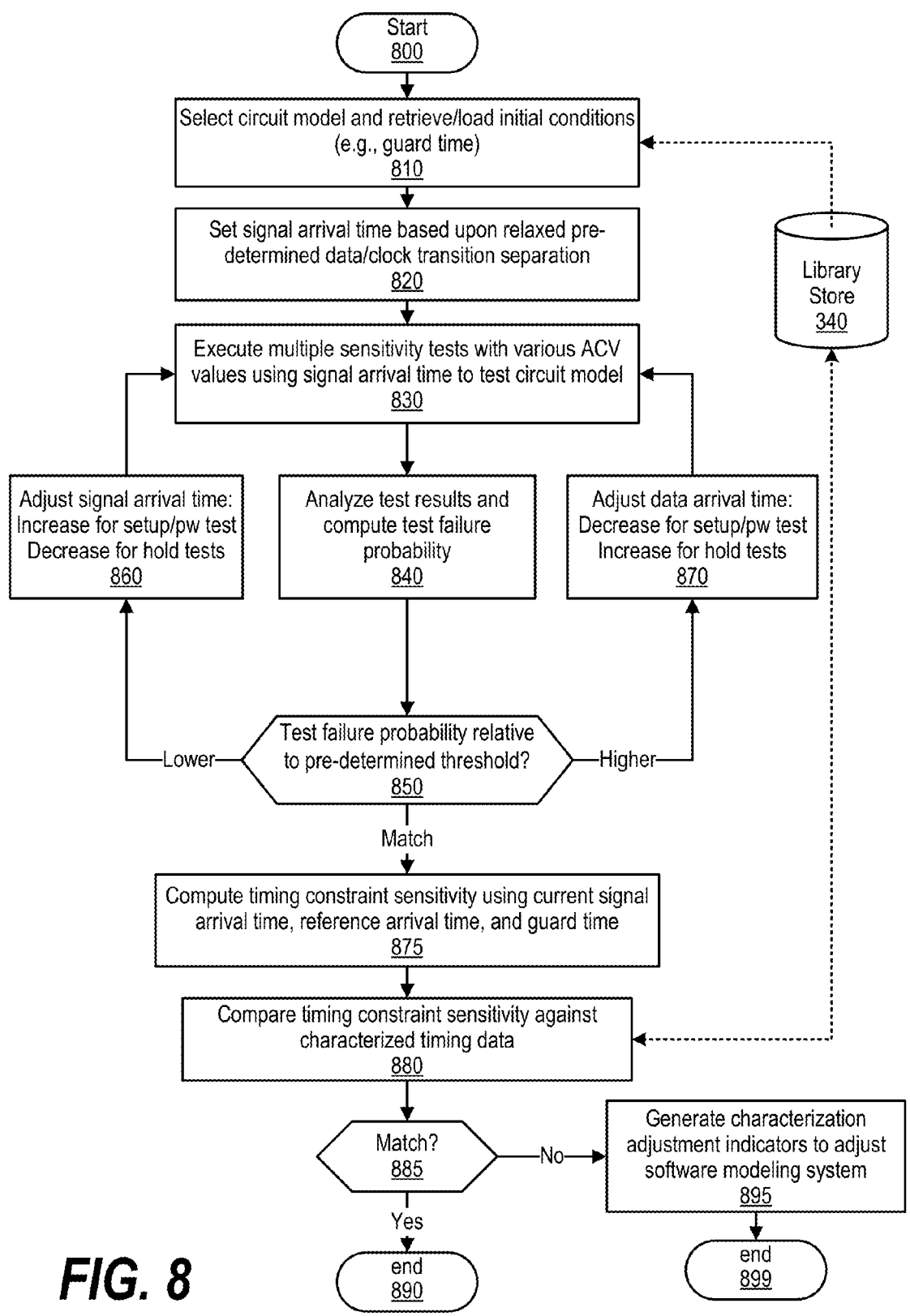
FIG. 8 is an exemplary flowchart depicting steps taken by a sensitivity test system to generate timing constraint sensitivities for circuit models based upon actual test failure variabilities and using the timing constraint sensitivities to verify characterized sensitivities generated during library characterization.

FIG. 8 is an exemplary flowchart depicting steps taken by a sensitivity test system to generate timing constraint sensitivities for circuit models based upon actual test failure variabilities and using the timing constraint sensitivities to verify characterized sensitivities generated during library characterization. Processing commences at 800, whereupon, at step 810, the process selects a circuit model from library store 340 and retrieves/loads initial conditions for the selected circuit model. In one embodiment, the process selects sequential circuit models, such as latches, and the circuit model includes intrinsic guard times for various conditions.

At step 820, the process sets a signal arrival time based upon a relaxed pre-determined signal/reference transition separation. For example, the process may multiply the intrinsic guard time by 150% for a setup test to determine an initial relaxed signal arrival time. At step 830, the process executes a sensitivity assessment using the relaxed signal arrival time. The sensitivity assessment tests the selected circuit model multiple times using different ACV parameters in order to achieve an adequate sampling and assess a probability of the number of times that the circuit model will fail given the relaxed signal arrival time, such as 10,000 tests.

At step 840, the process analyzes test results from the tests and computes a test failure probability, which is the number of failures relative to the number of total tests. The process determines whether the test failure probability matches a pre-determined 3-sigma threshold, is higher than the pre-determined 3-sigma threshold, or is lower than the pre-determined 3-sigma threshold (decision 850). As discussed earlier, a 3-sigma variability threshold equates to 13-14 failures per 10,000 tests.

If the failure probability is lower than the pre-determined 3-sigma threshold, then decision 850 branches to the "lower" branch. For example, the sensitivity tests may have produced five failures but the pre-determined 3-sigma threshold equates to 13-14 failures. At step 860, the process adjusts the signal arrival time based upon whether the test is a setup/pulse width test or a hold test. If the test is a setup test, the process increases the signal arrival time to make the data available closer to the clock transition to increase the number of setup test failures from the sensitivity tests. If the test is a pulse width test, the process increases the signal arrival time to decrease the pulse width of the clock and increase the number of pulse width test failures. If the test is a hold test, the process decreases the signal arrival time to make the data available (next data transition) closer to the clock transition to increase the number of hold test failures. The process then re-executes the sensitivity tests using the adjusted signal arrival time (step 830) and analyzes the new test results accordingly (step 840).

On the other hand, if the failure probability is higher than the pre-determined 3-sigma threshold, such as 50 failures instead of the desired 13-14 failures, then decision 850 branches to the "higher" branch. At step 870, the process adjusts the signal arrival time based upon whether the test is a setup/pulse width test or a hold test. If the test is a setup test, the process decreases the signal arrival time to make the data available farther away from the clock transition to decrease the number of setup test failures from the sensitivity tests. If the test is a pulse width test, the process decreases the signal arrival time to increase the pulse width of the clock and decrease the number of pulse width test failures. If the test is a hold test, the process increases the signal arrival time to make the data available (next data transition) farther away from the clock transition to decrease the number of hold test failures. The process then re-executes the sensitivity tests using the adjusted signal arrival time (step 830) and analyzes the new test results accordingly (step 840).

When the failure probability matches, or is within a range of, the pre-determined probability threshold, decision 850 branches to the "match" branch. At step 875, the process computes a timing constraint sensitivity using the current signal arrival time, the reference arrival time, and the guard time in a manner as discussed above based upon the test. The process, at step 880, compares the timing constraint sensitivity against characterized sensitivities of the circuit model that were generated during library characterization. For example, software modeling system 395 may generate the characterized sensitivities by executing simulations that calculate the sensitivity of each timing constraint arc of the circuit model at each clock and data slew.

The process determines whether the timing constraint sensitivity matches, or within a pre-defined tolerance of, the characterized sensitivity (decision 885). If the comparison results in a match or a pre-defined tolerance, decision 885 branches to the "Yes" branch, indicating verification of the characterized sensitivity, and FIG. 8 processing thereafter ends at 890. On the other hand, if the timing constraint sensitivity does not match, or not within a pre-defined tolerance of, the characterized sensitivity, decision 885 branches to the "No" branch, whereupon the process generates characterization adjustment indicators that flag the unmatched, or uncorrelated, characterized sensitivities. The characterization adjustment indicators are in turn utilized to adjust modeling parameters of software modeling system 395 to increase the accuracy of the characterized sensitivities generated during library characterization. For example, technology model parameter values may be added or changed, circuit model configuration or stimulus may be changed, different measurements may be made and/or changes to sensitivity calculation may be made. FIG. 8 processing thereafter ends at 899.

FIG. 9 is an exemplary diagram depicting hold test sensitivity results with different signal arrival times that include test failure probabilities and test pass probabilities. Hold test results 900 shows twenty different sensitivity tests (column 910) results with different signal arrival times (column 920). In one embodiment, as discussed earlier, the clock transition time remains fixed (reference arrival time) and, therefore, column 930 shows the difference between the different signal arrival times in column 920 and the fixed reference arrival time of the clock. Column 940 includes voltage levels at an internal node of the circuit under test.

Columns 960 and 970 include the probability of fails and passes, respectively, that are computed from running multiple simulations as discussed earlier. Row 980 shows that the probability of fails and passes is each 50%, which signifies the guard time. As such, column 950 shows the timing deviation of the signal arrival time between the guard time simulation run and the other simulation runs. Row 990 shows that the probability of passes is 0.9986 in column 970, which meets the 3-sigma probability threshold. As such, the timing deviation in row 990, column 950, is the sensitivity (3.9198 picoseconds).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   executing a plurality of first sensitivity tests on a circuit model using a first signal arrival time value, the executing resulting in a plurality of first test results;
   adjusting the first signal arrival time value to a second signal arrival time value in response to determining that the plurality of first test results do not meet a pre-determined probability threshold;
   executing a plurality of second sensitivity tests on the circuit model using the second signal arrival time value, the executing resulting in a plurality of second test results;

in response to determining that the plurality of second test results meets the pre-determined probability threshold, computing a timing constraint sensitivity utilizing the second signal arrival time value;

determining whether the timing constraint sensitivity is within a pre-defined tolerance of a characterized sensitivity of the circuit model, wherein the characterized sensitivity was generated by a software modeling system during library characterization of the circuit model; and adjusting one or more modeling parameters of the software modeling system based upon the determining, wherein the software modeling system generates a changed characterized sensitivity of the circuit model using the adjusted one or more modeling parameters.

2. The method of claim 1 wherein the plurality of sensitivity tests correspond to a setup test, and wherein the method further comprises:

wherein the first signal arrival time value is longer than the second signal arrival time value; and decreasing the first signal arrival time value to the second signal arrival time value in response to determining that the plurality of first test results include an amount of test failures that is greater than the pre-determined probability threshold.

3. The method of claim 1 wherein the plurality of sensitivity tests correspond to a setup test, and wherein the method further comprises:

wherein the first signal arrival time value is shorter than the second signal arrival time value; and increasing the first signal arrival time to the second signal arrival time in response to determining that the plurality of first test results includes an amount of test failures that is less than the pre-determined probability threshold.

4. The method of claim 1 wherein the plurality of sensitivity tests correspond to a hold test, and wherein the method further comprises:

wherein the first signal arrival time value is shorter than the second signal arrival time value; and increasing the first signal arrival time value to the second signal arrival time value in response to determining that the plurality of first test results include an amount of test failures that is greater than the pre-determined probability threshold.

5. The method of claim 1 wherein the plurality of sensitivity tests correspond to a hold test, and wherein the method further comprises:

wherein the first signal arrival time value is longer than the second signal arrival time value; and decreasing the first signal arrival time value to the second signal arrival time value in response to determining that the plurality of first test results include an amount of test failures that is less than the pre-determined probability threshold.

6. The method of claim 1 wherein the plurality of sensitivity tests correspond to a pulse width test, and wherein the method further comprises:

wherein the first signal arrival time value is longer than the second signal arrival time value; and decreasing the first signal arrival time value to the second signal arrival time value in response to determining that the plurality of first test results include an amount of test failures that is greater than the pre-determined probability threshold.

7. The method of claim 1 wherein plurality of sensitivity tests correspond to a pulse width test, and wherein the method further comprises:

wherein the first signal arrival time value is shorter than the second signal arrival time value; and increasing the first signal arrival time value to the second signal arrival time value in response to determining that the plurality of first test results include an amount of test failures that is less than the pre-determined probability threshold.

8. The method of claim 1 wherein:

the information handling system is a circuit model testing system;

the plurality of sensitivity tests are simulated on a Monte Carlo simulator that generate one or more actual test failures, the one or more actual test failures included in the plurality of first test results; and the circuit model is a sequential circuit and each of the plurality of sensitivity tests has at least one unique across chip variation (ACV) parameter value.

9. The method of claim 1 wherein at least one of the one or more modeling parameters are selected from the group consisting of a technology model setting parameter, a circuit model configuration parameter, a simulation stimulus parameter, and a sensitivity measurement results calculation parameter.

10. The method of claim 1 further comprising:

utilizing the changed characterized sensitivity to perform a timing analysis on an integrated circuit that includes the circuit model, wherein the timing analysis produces one or more timing analysis test results.

* * * * *